Patented June 24, 1941

2,246,779

UNITED STATES PATENT OFFICE 2,246,779

PROLAMIN CONTAINING COMPOSITIONS AND SOLUTIONS

Roy E. Coleman, Meriden, Conn., assignor, by mesne assignments, to Time, Incorporated, a corporation of New York No Drawing. Application July 18, 1938, Serial No. 219,826

13 Claims. (Cl. 134—12)

This invention relates to liquid coating compositions and solutions made from zein or other prolamins; and more particularly to substantially non-aqueous solutions of zein in acidified solvent mixtures and to methods of preparing the same. The solutions or coating compositions prepared in accordance with my invention do not separate on standing, have a definitely delayed or retarded tendency to gel and, in some instances, are non-gelling over periods of time in the order of 3 to 6 months and even more.

In the following description of my invention I refer to the preparation of non-separating, substantially non-gelling solutions or coating compositions of zein derived from corn, but it is, of course, to be understood that my invention is also applicable to the preparation of solutions or coating compositions made from other prolamins such as, for example, gliadin from wheat, hordein from barley, kafirin from kafir and the prolamins from other cereal grains. The above-mentioned prolamins are at present ordinarily derived by extraction of the gluten of corn or other grains with an aqueous alcohol solution in which the added water varies generally from about 8 to about 40% of the solvent mixture, the extract so produced being dried, forming a dried prolamin extract which may be completely dry or in commercial form ordinarily contains a small percentage of moisture. Such prolamin extract, such as zein extracted from corn, may be used in accordance with my invention, although zein or other prolamin obtained in any other suitable manner may also be used.

In accordance with the prior art methods of making zein solutions or coating compositions wherein zein is dissolved in a solvent such as methanol, isopropanol, butanol, and other low-molecular weight alcohols, glycol ethers and the like containing relatively large quantities of water in the order of over 5% and up to about 30% and higher, the solutions or coating compositions formed are not suitable for use over practical periods of time because of a tendency to thicken and in many cases to gel. The presence of these relatively large percentages of water and other factors, such as concentration of zein in the solutions or coating compositions, and the presence of solvents such as those mentioned above, particularly methanol, contribute to the thickening or gelling of the solutions or coating compositions on standing.

In my prior co-pending application, Serial No. 158,209, filed August 9, 1937, I described and claimed methods of preparing substantially non- aqueous solutions of zein in alcohol containing 5% and less of added water wherein the zein varies in weight from about one-third to about one-fourth of the solution. These solutions are stable as regards separation in the cold, that is, at temperatures under 80° F. and at temperatures of 70° F. and somewhat lower. In my prior copending application Serial No. 158,215, filed August 9, 1937, I claim these solutions as well as other solutions which also are stable as regards separation at these temperatures.

In particular, in my prior application Serial No. 158,215 I described solutions and liquid coating compositions containing prolamins and particularly zein which are anhydrous or substantially anhydrous and which, in concentrations in which the proportion of solvent to zein is from about 2:1 upward, and more particularly from 4 to 5:1, are stable in the cold in that they do not separate or form and deposit a separate phase or layer containing largely zein with a supernatant layer of liquid consisting largely of solvent. The formation of such stable solutions is important in connection with the utilization of zein and similar prolamins in the production of coating compositions and the like, since they enable the zein to be put in a homogeneous and usable form either for direct use or for compounding with other materials, solvents, non-solvents, coating and film-forming materials and the like.

It has been found, however, that the zein solutions of the prior art and even some of the stable character hereinbefore referred to are limited in their application and use because of a tendency, which frequently appears, to increase in viscosity; that is, to thicken or to become heavier in body; and in many cases to gel. Such tendencies to increase in viscosity, or to gel, while not preventing the utilization of the compositions immediately or within short periods after preparation, do impose serious limitations on their wide-spread commercial application and utilization, since the materials must remain stable and reasonably constant in their characteristics during the periods necessary for transportation and distribution either in bulk or in packages, and to permit of reasonable periods of storage.

In accordance with the present invention, I have developed solutions containing prolamins and particularly zein, and methods of making the same, whereby the tendencies to gel, in which I include the tendency to increase in viscosity which is ordinarily a preliminary of gelling, are delayed and retarded and in many cases completely prevented, so as to increase greatly the field of applicability, and to permit wider distribution and conventional handling, of the manufactured products without material change in viscosity characteristics or solidification by gelling over such reasonable periods of time as are involved in such handling and distribution of the materials.

I am of the opinion that the phenomenon of gelling of such solutions and compositions and their increase in body or viscosity as a whole are probably related to the phenomenon of separation, since when separation takes place in many cases the separated phase containing larger proportions of zein is itself a gel in character; and since also in many cases compositions containing zein which tend to separate when the proportion of solvent to zein is as high as about 3:1 and higher will gel as a whole with lower proportions of solvent or higher concentrations of zein; and also since many solutions which are stable and do not separate when the proportion of solvent to zein is from 2 to 2.5:1 or higher will form gels as a whole if they contain higher proportions of zein. However, in the consideration of the tendency to gel and to increase in viscosity or body as referred to in the present application I have reference to the tendency of solutions to gel as a whole or to increase in viscosity through their entire mass, in cases in which the proportions of solvent to zein are in the order of 2 to 2.5:1 and higher, up to 9 or 10:1, which are the solutions and compositions of a concentration which is most important from the standpoint of the production of films, coatings and the like and which range of concentration is more particularly referred to in my aforesaid prior copending applications, relating to the production of stable solutions. It is to be appreciated that solutions or compositions which are stable and in which the tendencies to gel and to increase in viscosity are adequately retarded or prevented within this range of concentrations may, with higher concentrations of zein, be more likely to form gels; but in any case the compositions prepared in accordance with the present invention will have a less tendency to form gels or to increase in viscosity than the solutions hitherto known.

In accordance with my present invention, I have found that I can prepare stable solutions or coating compositions of zein wherein the concentration of zein varies from about 1 part by weight thereof to about 3 to 9 and up to 20 parts by weight of the solvent or solvent mixture by including in admixture therewith an acid component. The solvent used may be, for example, a zein solvent such as an anhydrous or substantially non-aqueous alcohol, such as anhydrous or 95% ethanol; anhydrous or substantially non-aqueous denatured alcohol or other zein solvent.

The solvent mixtures used in accordance with the present invention are characterized by the presence of both an alcoholic and an acid component. The liquid coating compositions prepared in accordance with my present invention may be anhydrous or substantially non-aqueous as desired. In instances where water is added to such coating compositions, the amount of added water should not, in general, materially exceed 5% and should preferably be less than 5%. Accordingly, my preferred coating compositions are, for practical purposes, substantially non-aqueous. The presence of the acid component in the coating compositions definitely delays or retards gelling thereof to an extent not heretofore attainable and in many instances prevents gelling over considerable periods of time, for example, in the order of about three to six months and even longer. The addition of an acid component to the non-separating solutions described in my prior application Serial No. 158,209 likewise imparts to these solutions the desired non-gelling characteristics. In addition, the coating compositions are stable in so far as separation is concerned at temperatures of 70° F. and below and in many instances at temperatures of 40° F. and somewhat below.

The presence of an acid component in zein coating compositions delays or retards and, in many instances, prevents gelling not only when one or more of the low-molecular weight alcohols or denatured alcohols of the character set forth above is used in the solvent mixture, but also when other zein solvents such as glycol ethers, are used. The presence of an acid component in a solvent mixture comprising such zein solvents as, for example, the anhydrous or substantially non-aqueous glycols, diacetone alcohol, benzyl alcohol, furfuryl alcohol, cyclohexanol and like alcohols, and the alcohol ether, diethylene glycol monomethyl ether not only enhances their ability to delay or retard gelling but also appears to reduce the viscosity of the resulting solutions.

The acid component used in conjunction with a zein solvent to form coating compositions in accordance with the present invention is an organic acid. As examples of organic acids, the monobasic hydroxyl acids such as, for example, lactic acid; the aliphatic polybasic acids such as, for example, tartaric, succinic, maleic, malic, citric, fumaric, glutaric, adipic, pimelic, suberic, azelaic, sebacic, and the like; the aromatic polybasic acids such as, for example, phthalic, diphenic, and the like; the ether acids such as, for example, diglycolic, dilactic, and salicylacetic; the ketone acids such as, for example, benzophenone-2.4' dicarboxylic; the rosin and resin acids, and like organic acids have been used. The acid component may be used in powder, crystal or liquid form depending, of course, on the form which is commercially available. If the alcohol or zein solvent is incapable of readily dissolving the desired amount of the acid component, small amounts of water, within the limits hereinbefore stated, may be added to the alcohol to aid solution. In the instances where the alcohol already contains water, solution of the desired amounts of acid component in the alcohol ordinarily affords no particular problem.

The quantity of acid component which may be used in admixture with the alcohol in accordance with my invention may vary widely, but sufficient should be used to render the alcohol definitely acid; and at the same time not so large an amount should be used as will affect the character of the zein. I have obtained satisfactory results with the use of an organic acid in amounts varying from about 1% to 2% and up to 20% and even higher of the solvent mixture although for most purposes satisfactory results have been obtained with the use of acids in proportions varying from 3% to 8%. In general, the quantity of acid component required in the solvent mixture to prevent separation and to retard and prevent gelling varies with the concentration of zein in the solution; with high concentrations of zein, larger amounts of the acid component are required and with low concentrations of zein, smaller amounts of the acid component are required.

In carrying out the present invention, the zein or other prolamin is mixed with the alcohol or acid solvent mixture. The mixing may be carried out in any suitable vessel or container such as, for example, a beaker or kettle, usually with some stirring and with the application of heat in the order of about 110° to 200° F. A stable solution of the zein in the solvent mixture is obtained generally in about 3 to 15 minutes, and in most instances satisfactory stable solutions are obtained in about 5 to 10 minutes with the utilization of heat in the order of about 120° to 175° F.

The present invention is illustrated by the following examples of coating compositions embodying my invention and of the methods of preparing the same; however, my invention is not to be construed as limited to the details thereof since other suitable compositions in other suitable proportions are intended to be included within the scope of my claims. In the examples, the term "parts" indicates parts by weight. Also in the examples, when I refer to anhydrous denatured alcohol I have reference to the commercial anhydrous denatured alcohol of the following formula:

| | Approximate per cent |
|---|---|
| Anhydrous ethyl alcohol | 89.3 |
| Anhydrous methyl alcohol | 4.4 |
| Ethyl acetate | 6.3 |

When I refer to hydrated anhydrous denatured alcohol, I have reference to an alcohol solvent mixture containing 95.6% of the above anhydrous denatured alcohol and 4.4% of water.

Example 1

10 parts of zein are mixed with 36 parts of ethanol (95%) and 4 parts of powdered succinic acid in a suitable vessel and the mixture is heated to about 170° F. for about five to seven minutes to form a clear, stable solution of zein. The solution formed does not separate, settle or gel on standing at room temperature or even when cooled to about 45° to 50° F.

Example 2

10 parts of zein are mixed with 33⅓ parts of hydrated anhydrous denatured alcohol and 6⅔ parts of powdered succinic acid in a suitable vessel and heated to about 165° to 170° F. for about 5 to 6 minutes to effect solution. The solution on standing at room temperature in the order of about 60° to 70° F. shows no tendency to separate, settle or gel.

Example 3

10 parts of zein are mixed with 45 parts of hydrated anhydrous denatured alcohol and 5 parts of tartaric acid crystals in a suitable vessel and heated to about 130° to 135° F. to effect solution. The solution on standing shows no tendency to separate or settle and practically no tendency to gel.

Other zein solvents or solvent mixtures may be employed instead of those referred to in Examples 1, 2 and 3, with only sufficient water present (not more than 5%) to effect solution of the acids used.

Example 4

10 parts of zein are mixed with 60 parts of anhydrous denatured alcohol and 6 parts of C. P. lactic acid (85%) in a suitable vessel and heated to about 125° to 130° F. for about 5 to 7 minutes to effect solution. The solution at room temperature shows no tendency to separate, settle or gel.

Example 5

10 parts of zein are mixed with 22.5 parts of anhydrous denatured alcohol and 2.5 parts of C. P. lactic acid (85%) in a suitable vessel and heated to about 125° to 130° F. for about 5 to 10 minutes to effect solution. The solution formed is non-gelling.

Anhydrous ethyl alcohol or other anhydrous direct solvents or solvent mixtures may be used in formulas such as Examples 4 and 5 instead of the solvent therein described, with the formation of substantially non-gelling solutions.

The zein containing solutions or liquid coating compositions prepared in accordance with the present invention have an extremely light, pale, straw color not heretofore attainable in zein solutions. These solutions have a definitely delayed or retarded tendency towards gelling and in some instances do not gel even over considerable periods of time, for example, in the order of about 3 to 6 months and even longer. Moreover, these solutions are stable in so far as separation is concerned even when cooled to temperatures of 50 to 70° F. and somewhat below. When cooled to temperatures below the limits set forth above, the solutions may, at times, separate or become solid; however, on reheating again to temperatures of from about 45 to 70° F. a re-solution is effected even without, or with slight, stirring and these solutions return to their normal form at the reheating temperatures. The solutions embodying my invention are further characterized in that they contain no added water or only a small amount of added water and are, therefore, substantially non-aqueous.

The coating compositions prepared in accordance with the present invention have the unusual property, particularly when heated, of being able to "give up" their solvent or solvents readily when applied to any surface and they readily form tough, flexible, non-tacky, hard and generally transparent films. The films are very strong and have unusual adhesive properties. They are not readily inflammable, as are films of such substances as nitrocellulose, pyroxylin and the like. The films are oil resistant and provide an excellent printing surface for any type of ink. With the aid of these coating compositions, film-forming properties can be built up to produce a film of greater toughness, flexibility, hardness and gloss than is capable of being formed from coating compositions containing added water as in the prior art. The presence of, for example, lactic acid in the coating compositions improves the color and body of the zein solutions and retards the initial setting of the zein film.

The coating compositions embodying my invention may be applied to any surface, including surfaces coated with, for example, varnish, lacquer, rubber, or cellulose derivatives and form hard, adherent films thereon. They may be used for coating, sizing, impregnating and waterproofing various materials, such as paper, textiles, wood, porous stone, wood pulp and the like. When coated on paper, Cellophane, glass and the like, a non-blushing film is formed almost immediately which possesses the film characteristics set forth above. Since these coating compositions have decided adhesive properties before setting, they may be used for uniting or laminating paper, cloth, wood, glass, silk, Cellophane, metals and metal foils and the like.

The characteristics of the substantially non-aqueous zein solutions or coating compositions embodying my invention and hence of the ultimate films can be altered as desired by the inclusion in the coating compositions of diluents, modifiers, plasticizers and the like as set forth in my above-identified copending application Serial No. 158,215. The characteristics, such as spread and flow of the coating compositions, may also be modified by the addition of a fatty acid, such as, for example, oleic, linseed, hemp seed, lauric and like fatty acids, by the inclusion of blown or bodied drying oils such as blown Chinawood oil or other oxidizing oils, and by the inclusion of cetyl, lauryl, myristyl and like fatty alcohols having 8 or more carbon atoms in the chain. If desired, compatible natural and synthetic resins such as, for example, rosin, sandarac, copal, phenol-aldehyde, urea-aldehyde, glycerine-phthalic anhydrid, vinyl and like resins, or heat-hardening liquid coating compositions of the type described and claimed in my prior copending application Serial No. 177,302, filed November 30, 1937, or compatible cellulose derivatives such as, for example, high and low viscosity nitrocellulose, cellulose acetate, ethyl cellulose and like cellulose derivatives may be incorporated with the liquid coating compositions in varying proportions to meet any desired need.

If desired, suitable fillers such as, for example, those set forth in my application Serial No. 158,215 can be incorporated in the coating compositions.

I claim:

1. A coating composition containing not in excess of about 5% of added water comprising a solution of a prolamin in a solvent mixture comprising an alcohol and an organic acid other than the lower aliphatic acids, said solvent mixture containing not in excess of 5% of water and said composition being stable against separation of the prolamin at temperatures of 70° F. and being substantially non-gelling.

2. A coating composition containing not in excess of about 5% of added water comprising a solution of zein in a solvent mixture comprising an alcohol and an hydroxy carboxylic acid, said solvent mixture containing not in excess of 5% of water and said composition being stable against separation of the zein at temperatures of 70° F. and being substantially non-gelling.

3. A coating composition containing not in excess of about 5% of added water comprising a solution of zein in a solvent mixture comprising an alcohol and a monobasic hydroxy acid, said solvent mixture containing not in excess of 5% of water and said composition being stable against separation of the zein at temperatures of 70° F. and being substantially non-gelling.

4. A coating composition containing not in excess of about 5% of added water comprising a solution of zein in a solvent mixture comprising an alcohol and an aliphatic polybasic acid, said solvent mixture containing not in excess of 5% of water and said composition being stable against separation of the zein at temperatures of 70° F. and being substantially non-gelling.

5. A coating composition containing not in excess of about 5% of added water comprising a solution of zein in a solvent mixture comprising an alcohol and an aromatic polybasic acid, said solvent mixture containing not in excess of 5% of water and said composition being stable against separation of the zein at temperatures of 70° F. and being substantially non-gelling.

6. A coating composition containing not in excess of about 5% of added water comprising a solution of zein in a solvent mixture comprising an alcohol and succinic acid, said solvent mixture containing not in excess of 5% of water and said composition being stable against separation of the zein at temperatures of 70° F. and being substantially non-gelling.

7. A coating composition containing not in excess of about 5% of added water comprising a solution of zein in a solvent mixture comprising an alcohol and lactic acid, said solvent mixture containing not in excess of 5% of water and said composition being stable against separation of the zein at temperatures of 70° F. and being substantially non-gelling.

8. A coating composition containing not in excess of about 5% of added water comprising a solution of zein in a solvent mixture comprising a denatured alcohol and an organic acid other than the lower aliphatic acids, said solvent mixture containing not in excess of 5% of water and said composition being stable against separation of the zein at temperatures of 70° F. and being substantially non-gelling.

9. A coating composition containing not in excess of about 5% of added water comprising a solution of zein in a solvent mixture comprising ethyl alcohol and an organic acid other than the lower aliphatic acids, said solvent mixture containing not in excess of 5% of water and said composition being stable against separation of the zein at temperatures of 70° F. and being substantially non-gelling.

10. A coating composition containing not in excess of about 5% of added water comprising a solution of zein in a solvent mixture comprising a glycol ether and an organic acid other than the lower aliphatic acids, said solvent mixture containing not in excess of 5% of water and said composition being stable against separation of the zein at temperatures of 70° F. and being substantially non-gelling.

11. A coating composition containing not in excess of about 5% of added water comprising a solution of zein in a solvent mixture comprising a glycol and an organic acid other than the lower aliphatic acids, said solvent mixture containing not in excess of 5% of water and said composition being stable against separation of the zein at temperatures of 70° F. and being substantially non-gelling.

12. A liquid coating composition containing not in excess of about 5% of added water comprising a solution of zein in a solvent mixture comprising a substantially neutral, hydroxy organic zein solvent and an organic acid other than the lower aliphatic acids, said solvent mixture containing not in excess of 5% of water and said composition being stable against separation of the zein at temperatures of 70° F. and being substantially non-gelling.

13. A liquid coating composition containing not in excess of about 5% of added water comprising a solution of zein in a solvent mixture containing ethyl alcohol and succinic acid, said solvent mixture containing not in excess of 5% of water and said composition being stable against separation of the zein at temperatures of 70° F. and being substantially non-gelling.

RCY E. COLEMAN.